US009462575B2

(12) United States Patent
Vermani et al.

(10) Patent No.: US 9,462,575 B2
(45) Date of Patent: Oct. 4, 2016

(54) LOW RATE DATA COMMUNICATION

(71) Applicant: QUALCOMM Incorporated, San Diego, CA (US)

(72) Inventors: Sameer Vermani, San Diego, CA (US); Bin Tian, San Diego, CA (US); Rahul Tandra, San Diego, CA (US); Hemanth Sampath, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/467,894

(22) Filed: Aug. 25, 2014

(65) Prior Publication Data

US 2015/0063334 A1 Mar. 5, 2015

Related U.S. Application Data

(60) Provisional application No. 61/871,241, filed on Aug. 28, 2013.

(51) Int. Cl.
- *H04W 4/00* (2009.01)
- *H04W 72/04* (2009.01)
- *H04L 29/06* (2006.01)
- *H04L 1/04* (2006.01)

(Continued)

(52) U.S. Cl.
CPC ........ *H04W 72/0406* (2013.01); *H04L 1/0011* (2013.01); *H04L 1/0025* (2013.01); *H04L 1/0028* (2013.01); *H04L 1/0075* (2013.01); *H04L 1/04* (2013.01); *H04L 1/08* (2013.01); *H04L 1/189* (2013.01); *H04L 69/22* (2013.01); *H04L 69/24* (2013.01); *H04L 1/0003* (2013.01); *H04L 1/0009* (2013.01); *H04L 1/1812* (2013.01)

(58) Field of Classification Search
CPC ... H04W 72/04; H04W 72/0406; H04L 29/06; H04L 69/24; H04L 69/22; H04L 1/0011
USPC .......................................... 370/338
See application file for complete search history.

(56) References Cited

U.S. PATENT DOCUMENTS 7,519,030 B2 4/2009 Cimini, Jr. et al.
7,616,970 B2 11/2009 Gorsuch (Continued)

FOREIGN PATENT DOCUMENTS

WO 2013069918 A1 5/2013
WO 2013085362 A1 6/2013

OTHER PUBLICATIONS

Partial International Search Report—PCT/US2014/052656—ISA/EPO—Dec. 10, 2014.

(Continued)

*Primary Examiner* — Sai-Ming Chan
(74) *Attorney, Agent, or Firm* — Toler Law Group, PC

(57) ABSTRACT

A method includes generating a data packet at a source device for transmission via an Institute of Electrical and Electronics Engineers 802.11 wireless network. The data packet includes multiple data symbols that are duplicated in the data packet. At least a portion of a preamble of the data packet is not duplicated in the data packet. The portion of the preamble indicates that the packet is a low rate mode packet. The method also includes transmitting the data packet from the source device to a destination device via the wireless network.

30 Claims, 11 Drawing Sheets

(51) Int. Cl.
*H04L 1/08* (2006.01)
*H04L 1/00* (2006.01)
*H04L 1/18* (2006.01)

(56) References Cited

U.S. PATENT DOCUMENTS

| | | |
|---|---|---|
| 8,380,244 B2 | 2/2013 | Gorsuch |
| 2005/0233709 A1 | 10/2005 | Gardner et al. |
| 2009/0086696 A1 | 4/2009 | Naito et al. |
| 2011/0035522 A1* | 2/2011 | Tan .................... G06F 13/28 710/107 |
| 2012/0033682 A1 | 2/2012 | Corral |
| 2012/0201213 A1 | 8/2012 | Banerjea et al. |
| 2012/0324315 A1 | 12/2012 | Zhang et al. |
| 2012/0327871 A1 | 12/2012 | Ghosh et al. |
| 2013/0107893 A1* | 5/2013 | Zhang .................... H04L 1/00 370/474 |
| 2013/0107990 A1* | 5/2013 | Zhang .................. H04L 27/2613 375/329 |
| 2013/0121245 A1 | 5/2013 | Vermani et al. |
| 2013/0155976 A1* | 6/2013 | Chen .................. H04W 72/0453 370/329 |
| 2013/0195089 A1 | 8/2013 | Tandra et al. |
| 2014/0286356 A1 | 9/2014 | You et al. |

OTHER PUBLICATIONS

Ward L., "802.11ac Technology Introduction White Paper", Rohde & Schwarz, Mar. 2012, 29 pages.
International Search Report and Written Opinion—PCT/US2014/052656—ISA/EPO—Mar. 3, 2015.

* cited by examiner

LOW RATE DATA COMMUNICATION

I. CROSS-REFERENCE TO RELATED APPLICATIONS

The present application claims priority from U.S. Provisional Patent Application No. 61/871,241 filed on Aug. 28, 2013, the contents of which are expressly incorporated by reference in their entirety.

II. FIELD

The present disclosure is generally related to communicating data at a low rate.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Various wireless protocols and standards may be available for use by wireless telephones and other wireless devices. For example, the Institute of Electrical and Electronics Engineers (IEEE) 802.11, commonly referred to as "Wi-Fi," is a standardized set of wireless local area network (WLAN) communication protocols. In Wi-Fi protocols, data transmitted between a source device and a destination device may be susceptible to interference in areas where multiple data transmissions occur simultaneously. The success of a data transmission may also be affected by a transmit power for the source device.

IV. SUMMARY

High Efficiency Wi-Fi (HEW) is an IEEE 802.11 study group (SG) to explore potential updates and revisions to Wi-Fi standards to improve efficiency and operational performance in certain use cases. Data packets may be transmitted at lower data rates to reduce a signal-to-interference-and-noise-ratio (SINR) requirement (e.g., threshold) necessary to decode the data packets and to reduce an amount of interference during transmission.

To incorporate lower data rates into Wi-fi, various physical layer (PHY) parameters and designs may be used. The present disclosure provides reduced data rate transmission plans for use with a wireless communication (e.g., IEEE 802.11) system.

In a particular embodiment, a method includes generating a data packet at a source device for transmission via an Institute of Electrical and Electronics Engineers (IEEE) 802.11 wireless network. For example, an IEEE 802.11 wireless network may be a network that is compliant with at least one IEEE 802.11 standard. The data packet includes multiple data symbols that are duplicated in the data packet. At least a portion of a preamble of the data packet is not duplicated in the data packet. The portion of the preamble indicates that the packet is a low rate mode packet. The method also includes transmitting the data packet via the wireless network.

In another particular embodiment, a method includes generating a data packet at a source device for transmission via an IEEE 802.11 wireless network. The data packet includes multiple data symbols that are duplicated over multiple tones. At least a portion of a preamble of the data packet is not duplicated over multiple tones. The portion of the preamble indicates that the packet is a low rate mode packet.

In another particular embodiment, a method includes generating a data packet at a source device for transmission via an Institute of Electrical and Electronics Engineers 802.11 wireless network. The data packet includes multiple data symbols that are duplicated at multiple time intervals of the data packet. At least a portion of a preamble of the data packet is not duplicated at multiple time intervals. The method also includes transmitting the data packet from the source device to a destination device via the wireless network.

In another particular embodiment, a non-transitory computer-readable medium includes instructions that, when executed by a computer, cause the computer to perform operations including generating, at a source device, a data packet for transmission via an IEEE 802.11 wireless network. The data packet includes multiple data symbols that are duplicated in the data packet. At least a portion of a preamble of the data packet is not duplicated in the data packet, and the portion of the preamble indicates that the packet is a low rate mode packet. The operations also include transmitting the data packet from the source device to a destination device via the wireless network.

In another particular embodiment, a non-transitory computer-readable medium includes instructions that, when executed by a computer, cause the computer to perform operations including generating, at a source device, a data packet including multiple data symbols that are duplicated at multiple time intervals of the data packet. At least a portion of a preamble of the data packet is not duplicated at multiple time intervals. The operations also include transmitting the data packet via an Institute of Electrical and Electronics Engineers (IEEE) 802.11 wireless network.

In another particular embodiment, a method includes generating a data packet at a source device for transmission via an Institute of Electrical and Electronics Engineers 802.11 wireless network. The data packet is a five megahertz (MHz) data packet communicated using sixty-four tones.

In another particular embodiment, a method includes generating a data packet at a source device for transmission via an Institute of Electrical and Electronics Engineers 802.11 wireless network. Data symbols of the data packet are transmitted at a first binary phase shift keying (BPSK) rate that is less than a legacy BPSK rate of a legacy data packet. As used herein, a "BPSK rate" refers to the coding rate (alternately referred to as "code rate") of a packet that is BPSK modulated. For example, in a legacy standard such as IEEE 802.11ac, data packets according to modulation and coding scheme (MSC) 0 may have a data rate of 6.5 megabits per second (Mbps) using a legacy BPSK code rate of ½. The 6.5 Mbps data rate may correspond to 26 information bits in one orthogonal frequency division multiplexing (OFDM) symbol of 4 microseconds. Further, legacy standard IEEE 802.11a uses a similar BPSK code rate to generate data packets having a data rate of 6 Mbps. The described embodiment may reduce the data rate by to less than the 6-6.5 Mbps legacy rate.

In another particular embodiment, a method includes generating a data packet at a source device for transmission via an Institute of Electrical and Electronics Engineers 802.11 wireless network. The data packet is communicated using tones having smaller bandwidth than tones used to communicate a legacy data packet. The data packet includes repetition for signal fields and data fields, or a code rate for the signal fields and the data fields is lower than a legacy code rate for the legacy data packet. The method also includes transmitting the data packet via the wireless network.

In another particular embodiment, an apparatus includes a processor and a memory storing instructions executable by the processor to perform operations generating, at a source device, a data packet for transmission via an IEEE 802.11 wireless network. The data packet includes multiple data symbols that are duplicated in the data packet. At least a portion of a preamble of the data packet is not duplicated in the data packet, and the portion of the preamble indicates that the packet is a low rate mode packet. The operations also include transmitting the data packet from the source device to a destination device via the wireless network.

In another particular embodiment, an apparatus includes a processor and a memory storing instructions executable by the processor to perform operations including generating a data packet for transmission via an Institute of Electrical and Electronics Engineers (IEEE) 802.11 wireless network. Tones used to communicate the data packet have a smaller bandwidth than tones used to communicate a legacy data packet. The data packet also includes repetition for signal fields and data fields, or a code rate for the signal fields and the data fields is lower than a legacy code rate for the legacy data packet.

One particular advantage provided by at least one of the disclosed embodiments is reducing a signal-to-interference-and-noise-ratio (SINR) requirement necessary to decode data packets and/or making data packets less susceptible to interference during data communication in a populated wireless network by lowering a data rate of data packets during transmission. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
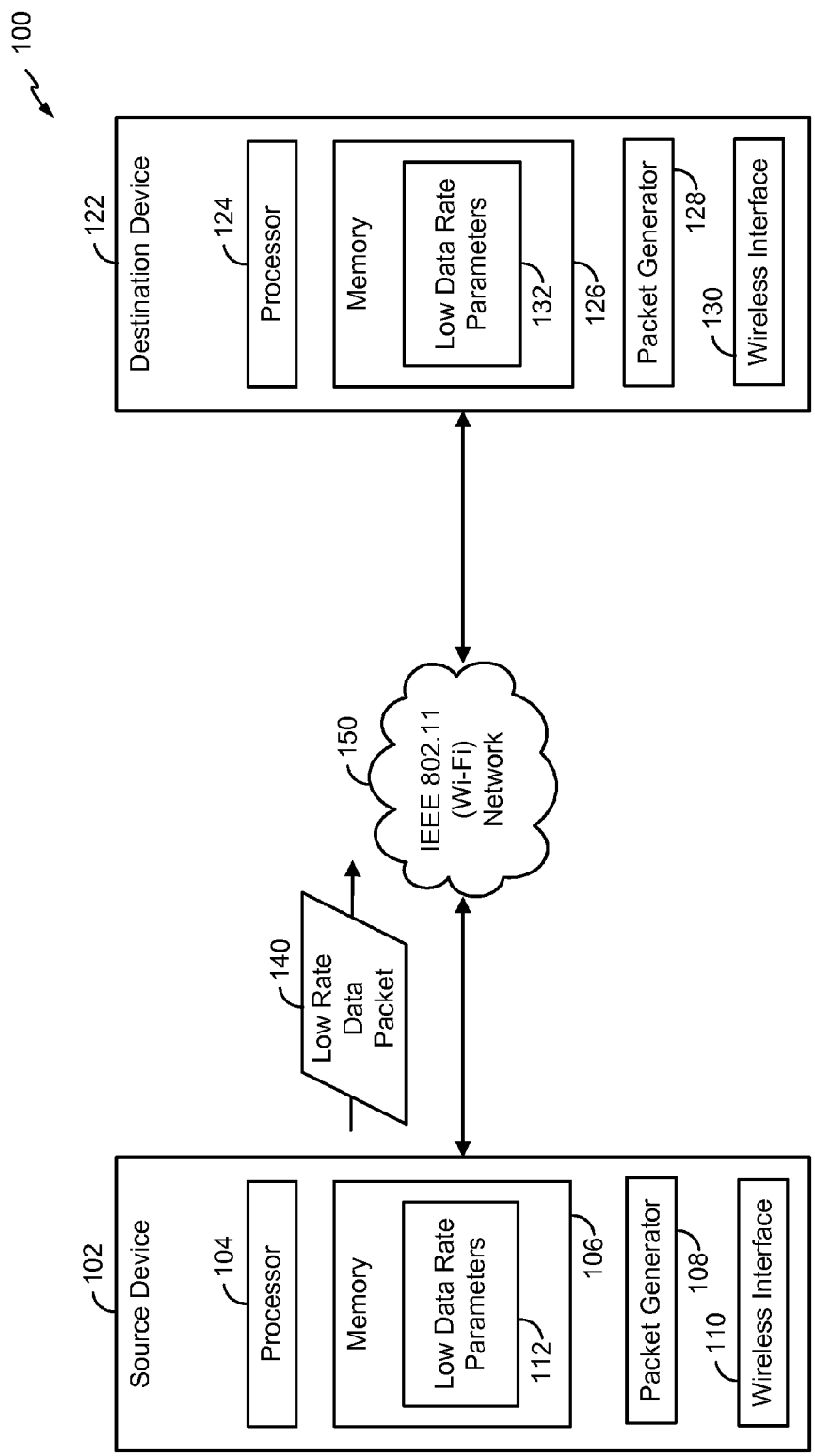
FIG. 1 is a block diagram of a particular illustrative embodiment of a system that is operable to communicate low rate data packets over a wireless network.

Referring to FIG. 1, a particular illustrative embodiment of a system 100 that is operable to communicate low rate data packets over a wireless network is shown. The system 100 includes a source device 102 configured to wirelessly communicate with a destination device 122 via a wireless network 150.

In a particular embodiment, the wireless network 150 is an Institute of Electrical and Electronics Engineers (IEEE) 802.11 wireless network (e.g., a Wi-Fi network). For example, the wireless network 150 may operate in accordance with an IEEE 802.11 standard. In an illustrative embodiment, the wireless network 150 is an 802.11 high efficiency Wi-Fi (HEW) network. In a particular embodiment, the wireless network 150 supports single and/or multiple access communication. For example, the wireless network 150 may support transmission of a low rate data packet 140 from the source device 102 to the destination device 122. In another example, the wireless network may support transmission of the low data rate packet 140 from the source device to multiple destination devices (not shown). In one example, the low rate data packet 140 may be an orthogonal frequency-division multiple access (OFDMA) packet, as further described herein. As used herein a "low rate" data packet may have a rate that is less than approximately 6-6.5 megabits per second (Mbps), which are the data rates provided by the IEEE 802.11a, 802.11n, and 802.11ac standards (e.g., provided by modulation and coding scheme (MCS) index 0 in the standards).

In a particular embodiment that is representative of a downlink transmission, the source device 102 may be an access point (AP) or other device (e.g., a coordinator of a basic service set (BSS)) configured to generate and transmit the low rate data packet 140 to the destination device 122 (e.g., a mobile phone). In another particular embodiment that is representative of an uplink transmission, the source device 102 may be a mobile phone configured to generate and transmit the low rate data packet 140 to the destination device 122 (e.g., an AP). The source device 102 includes a processor 104 (e.g., a central processing unit (CPU), a digital signal processor (DSP), a network processing unit (NPU), etc.), a memory 106 (e.g., a random access memory (RAM), a read-only memory (ROM), etc.), and a wireless interface 110 configured to send and receive data via the wireless network 150. The memory 106 may store low data rate parameters 112 (e.g., tone and time parameters) used by a packet generator 108 to generate the low rate data packet 140. The packet generator 108 may generate single access packets as well as multiple access packets.

When a packet (e.g., the low rate data packet 140) is communicated over a wireless medium, the packet may be communicated using a waveform that is modulated over a fixed frequency band during a fixed period of time. The frequency band may be divided into one or more "tones" and the period of time may be divided into one or more "symbols." As an illustrative non-limiting example, a 20 MHz frequency band may be divided into four 5 MHz tones and an 80 microsecond period may be divided into twenty 4 microsecond symbols. Accordingly, a "tone" may represent a frequency sub-band included in a waveform. A tone may alternately be referred to as a subcarrier. A "tone" may thus be a frequency domain unit. A "symbol" may be a time domain unit representing a duration of time included in the waveform. The waveform for a wireless packet may thus be visualized as a two-dimensional structure that includes multiple tones and multiple symbols. For the example packets illustrated in FIGS. 2-5 and further described herein, tones are illustrated on a vertical axis and symbols are illustrated on a horizontal axis. Thus, when data symbols of a data packet are duplicated over the frequency band associated with a data packet, multiple copies of the data symbols may be illustrated as being stacked vertically, as in FIG. 2. When data symbols of the data packet are duplicated over the time period associated with the data packet, multiple copies of the data symbols may be illustrated as being horizontally adjacent, as in FIG. 4.

As an example, a wireless device may receive a packet via a 20 megahertz (MHz) wireless channel (e.g., a channel having 20 MHz bandwidth). The wireless device may perform a 64-point fast Fourier transform (FFT) to determine 64 tones used to communicate the packet. A subset of the tones may be considered "useable" and the remaining tones may be considered "unusable" (e.g., may be guard tones, direct current (DC) tones, etc.). To illustrate, 56 of the 64 tones may be useable, including 52 data tones and 4 pilot tones. It should be noted that the aforementioned channel bandwidths, transforms, and tone plans are for example. In alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans may be used.

In a particular embodiment, the low data rate parameters 112 may be used by the packet generator 108 during generation of the low rate data packet 140 to determine tone allocations for data duplication, code rates (e.g., binary phase shift keying (BPSK) rates), and/or time intervals for data duplication. For example, the low rate data packet 140 may be communicated using tones allocated to common data that is duplicated over a frequency band of the low rate data packet 140, as described with respect to FIG. 2. Alternatively, the low rate data packet 140 may be coded using a code rate that is selected to reduce a signal-to-interference-and-noise-ratio (SINR) requirement necessary to decode the low rate data packet 140, as described with reference to FIG. 3. Alternatively, the low rate data packet 140 may include data symbols that are duplicated over a time period associated with the low rate data packet 140, as described with respect to FIG. 4. Additional examples of the low rate data packet 140 are described with respect to FIG. 5.

The destination device 122 may include a processor 124, a memory 126, and a wireless interface 130. The destination device 122 may also include a packet generator 128 configured to generate packets (e.g., single access packets or multiple access packets), as described with reference to the packet generator 108. In one example, the memory 126 may store low data rate parameters 132 identical to the parameters 112 in the source device 102.

During operation, the source device 102 may attempt to transmit data to the destination device 122 over the wireless network 150. The data may not be received (or acknowledged) by the destination device 122 due to a density (e.g., a high access points and/or mobile phones) in the wireless network 150 and/or due to a low transmit power of the source device 102. To improve the efficiency of data transmission over the wireless network 150, the source device 102 may transmit the data using the low rate data packet 140. For example, the low rate data packet 140 may be transmitted at a rate of approximately 1.5-1.625 megabits per second (Mbps) (e.g., approximately four times lower than a floor rate associated with the 802.11a standard, the 802.11g standard, the 802.11n standard, and the 802.11ac standard).

Reducing the data rate may reduce the effects of interference resulting from multiple data packets being simultaneously transmitted over the wireless network 150 (e.g., high density networks). For example, lower data rates may be associated with a lower signal-to-interference-and-noise-ratio (SINR), thus making the data less susceptible to higher levels of interference. Reducing the data rate may also reduce the effects of a low transmit power at the source device 102. For example, a header (e.g., a preamble) of the low rate data packet 140 may signal to the destination device 122 that the data rate at which the low rate packet 140 is to be decoded is less than that of a legacy data packet (e.g., an 802.11a, 802.11g, 802.11n, or 802.11ac data packet) or an "expected" data packet. The described low rate mode(s) may thus be used in dense, congested, and/or interference-limited networks (e.g., networks with low signal-to-noise ratio (SNR)). For example, if a mobile station has lower transmit power than an access point and is unable to complete uplink transmissions at 6-6.5 Mbps, the station may transition (or may request a transition) to the described low rate mode. As another example, if a mobile station is experiencing interference and an access point receives an indication that the station is experiencing the interference, the access point may transition downlink transmissions to the mobile station to the described low rate mode. The described low rate mode may thus serve as a fallback option.

Figure 2:
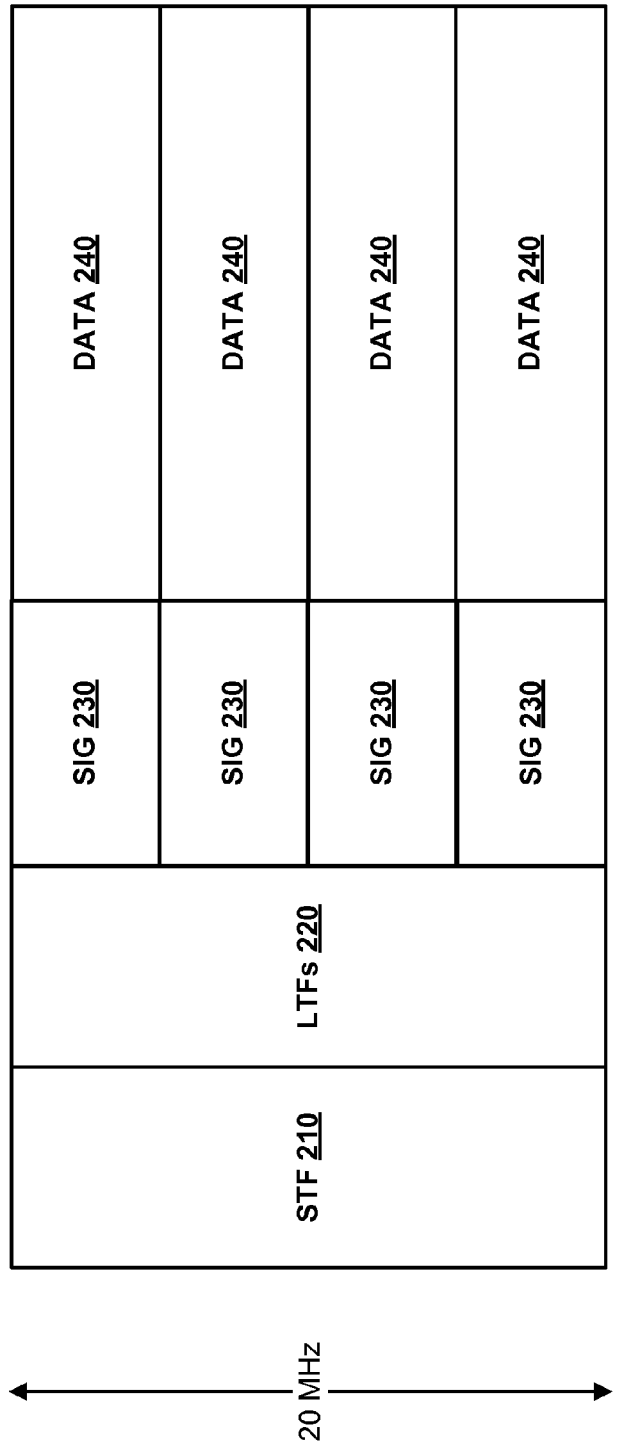
FIG. 2 is a particular embodiment of a data packet that is generated by the source device in FIG. 1.

Referring to FIG. 2, a particular embodiment of a data packet 200 that is communicated using an 802.11 wireless network is shown. In a particular embodiment, the data packet 200 may correspond to the low rate data packet 140 of FIG. 1 that is transmitted by the source device 102 to the destination device 122 via the wireless network 150. FIG. 2 illustrates an example of frequency domain duplication of data symbols. For example, as further described herein, data symbols of the data packet 200 are duplicated over a frequency band (e.g., 20 MHz frequency band) associated with the data packet 200.

The data packet 200 includes a short training field (STF) 210, long training fields (LTFs) 220, signal (SIG) fields 230, and data fields 240. A preamble of the data packet 200 includes the short training field 210, the long training fields 220, and the signal fields 230. In a particular embodiment, there may be two or more long training fields 220 in the data packet 200. The signal fields 230 include four signal fields, and the data fields 240 include four data fields that include data symbols. Each signal field 230 and each corresponding data field 240 may be duplicated over multiple tones (e.g., 256 subcarriers) used to communicate the data packet 200. For example, the data packet 200 may have a bandwidth of 20 MHz that is spread over 256 tones. Each signal field 230 and corresponding data field 240 may be duplicated over a five MHz bandwidth (e.g., 64 tones).

In a particular embodiment, the data packet 200 (and the data packets illustrated in FIGS. 3-5) may include (e.g., start with) a legacy short training field (L-STF), a legacy long training field (L-LTF), and a legacy signal (L-SIG) field. The L-STF, L-LTF, and L-SIG fields may collectively be referred to as a legacy preamble of the data packet 200 that precedes a remainder of the data packet 200 (e.g., a non-legacy preamble (e.g., STF, LTF, and SIG) and a data portion). In a particular embodiment, the legacy preamble enables legacy devices (e.g., non-HEW devices) to detect the data packet 200, even though the legacy devices may be unable to process portions of the packet 200 that follow the legacy preamble. Examples of legacy devices may include, but are not limited to, IEEE 802.11a/b/g/n/ac devices. Even though the legacy devices may not be able to process portions of the data packet 200 that follow the legacy preamble, the legacy preamble may be used to prevent the legacy devices from congesting a wireless medium during the duration of the data packet 200. For example, the legacy preamble may include a duration field, and the legacy devices may refrain from congesting the medium for the duration indicated by the duration field. In response to decoding the legacy preamble, a legacy device may refrain from communicating via a wireless network during the duration of the data packet 200 (e.g., during a time period during which the data packet 200 is being communicated).

The data packet 200 of FIG. 2 may be communicated using more data tones (e.g., data subcarriers) that are operable to transmit data bits (e.g., data symbols) than an 80 MHz legacy duplication (L-DUP) data packet. For example, an 80 MHz L-DUP data packet may be generated by down-clocking four legacy data packets (e.g., four 20 MHz 802.11a data packets) by a factor of four. Each legacy data packet may be communicated using 64 tones (e.g., 48 data tones, 11 guard tones, 4 pilot tones, and 1 DC tone). Thus, the 80 MHz L-DUP data packet may be communicated using 192 data tones (e.g., 48×4 data tones) that are operable to transmit data bits. The data packet 200 illustrated in FIG. 2 may be communicated using 234 data tones, which may yield an increase of 42 data tones. Thus, 58 distinct data symbols may be placed and duplicated in each of the four data fields 240 (e.g., 58×4=232 data tones) in the data packet 200 and two extra data tones may be used for additional data symbols.

In a particular embodiment, the short training field 210 and/or the long training fields 220 may have a longer duration than corresponding training fields used in an 802.11ac/n data packet. The short training field 210 and/or the long training fields 220 may be also be distinct (e.g., longer) from corresponding training fields used in the 802.11ac/n data packets after the 802.11ac/n data packets have been down-clocked by a factor (e.g., 4) to realize a data rate substantially equal to the data rate of the data packet 200. Two or more long training field symbols may be transmitted prior to the signal fields 230 (e.g., the two long training fields may precede the signal fields 230 in the data packet 200) to boost channel estimation. The boosted channel estimation may extract more (or the full) gain associated with duplicating the signal fields 230 and data fields 240 over a 20 MHz bandwidth. Additionally, or in the alternative, the short training field 210 and/or the long training fields 220 may include more power (e.g., a power boost) as compared to the corresponding training fields used in the 802.11ac/n data packet to realize more gain associated with duplicating the signal fields 230 and data fields 240 over a 20 MHz bandwidth.

The short training field 210 may be spread over 64 tones with every $4^{th}$ tone being populated, spread over 256 tones with every $16^{th}$ tone being populated, or spread over 256 tones with every $4^{th}$ tone being populated. Populating (e.g., sub-sampling) the tones in the short training field 210 may directly correspond to the periodicity of each symbol in the data packet 200. For example, populating every $16^{th}$ tone in the short training field 210 may result in 16 periods for every symbol (e.g., orthogonal frequency division multiple access (OFDMA) symbol or orthogonal frequency division multiplexing (OFDM) symbol) in the signal fields 230 and every corresponding data symbol in the data fields 240. Populating every $4^{th}$ tone may result in 4 periods for every OFDMA symbol in the signal fields 230 and every corresponding data symbol in the data fields 240.

Populating a different number of tones than every $4^{th}$ tone in a 64 tone short training field or every $16^{th}$ tone in a 256 tone short training field may indicate to a destination device (e.g., the destination device 122 of FIG. 1) that the signal fields 230 and the data fields 240 have been replicated four times over a 20 MHz bandwidth. For example populating a different number of tones may signal to a detector in the destination device that the periodicity of the data packet 200 is different than a legacy 20 MHz 802.11a packet. Alternatively, an orthogonal sequence in the long training fields 220 may be modified to indicate that the signal fields and the data fields 240 have been replicated. Thus, an unduplicated portion of the preamble of the data packet 200 (e.g., the STF or the LTF) may indicate that the data packet 200 is a low rate mode packet.

In a particular embodiment, the data packet 200 may also be communicated using a first number of tones (e.g., 256 tones) that is greater than a second number of tones (e.g., 64 tones) used to communicate a 20 MHz legacy data packet. The first number of tones may be greater than the second number of tones by a factor of four (e.g., a first factor). The short training field 210 may reduce the frequency correction ability by a second factor that is less than the first factor. For example, the tones in the long training fields 220, the signal fields 230, and the data fields 240 may be reduced with respect to a 20 MHz legacy data packet by the first factor. Populating every $16^{th}$ tone in the short training field 210 (e.g., a 256 tone short training field) may not reduce the pull-in range (corresponding to the frequency correction ability) compared to the pull-in range of the 20 MHz legacy data packet.

Duplicating the data over the four data fields 240 (e.g., 4× data repetition) may also enable a reduced data rate (e.g., 1.5-1.625 Mbps) of transmission as compared to the legacy data rate (e.g., 6-6.5 Mbps) of a legacy data packet. The reduced data rate may improve a signal-to-noise-ratio (SNR) of the data packet 200 during transmission over the 802.11 wireless network. The two or more long training fields 220 may be used to extract more (or the full) benefit of the improved SNR (e.g., approximately 6 decibels (dBs) of gain). The reduced data rate may also improve transmission reliability for data packets that are transmitted with a low transmit power.

Figure 3:
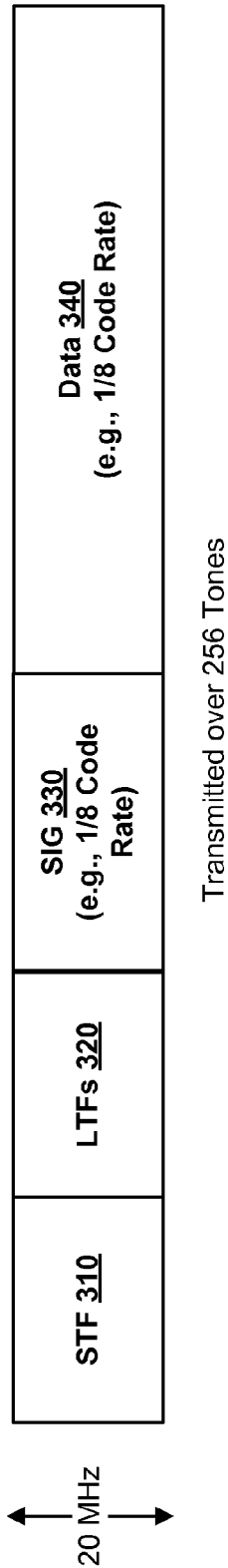
FIG. 3 is another particular embodiment of a data packet that is generated by the source device in FIG. 1.

Referring to FIG. 3, another particular embodiment of a data packet 300 that is communicated using an 802.11 wireless network is shown. In a particular embodiment, the data packet 300 may correspond to the low rate data packet 140 of FIG. 1 that is transmitted by the source device 102 to the destination device 122 via the wireless network 150.

The data packet 300 includes a short training field 310, long training fields 320, a signal field 330, and a data field 340. A preamble of the data packet 300 includes the short training field 310, the long training fields 320, and the signal field 330. In a particular embodiment, there may be two or more long training fields 320 in the data packet 300.

Symbols in the signal field 330 and data symbols in the data field 340 may be generated (e.g., encoded) using a reduced code rate. For example, a modulation and coding scheme (MCS) may indicate a binary phase shift keying (BPSK) modulation scheme having a reduced code rate (e.g., a reduced forward error correction (FEC) code rate as compared to a legacy FEC code rate of ½). Symbols in the signal field 330 and the data symbols in the data field 340 may be generated using a base rate of ⅛ BPSK. In alternate embodiments, a base rate other than ⅛ may be used.

The reduced code rate of the data packet 300 may enable hybrid automatic repeat request (HARQ) during data transmission. For example, the ⅛ code rate (e.g., a base code rate) may be used to selectively decrease the rate at which data is transmitted over an 802.11 wireless network. During a first transmission, the data packet 300 may include a parity bit for every data bit that is transmitted (e.g., a ½ rate transmission). If the data packet 300 is unable to be decoded using the ½ rate transmission, the rate may be reduced based on the base code rate. For example, additional parity bits may be used for every data bit that is transmitted until seven parity bits are used for every data bit that is transmitted (e.g., the ⅛ code rate). The rate may be continuously reduced using the base code rate until the data packet 300 is successfully decoded at the destination device.

In a particular embodiment, the short training field 310 and/or the long training fields 320 may have a longer duration than corresponding training fields used in an 802.11ac/n data packet. The short training field 310 and/or the long training fields 320 may be also be distinct (e.g., longer) from corresponding training fields used in the 802.11ac/n data packets after the 802.11ac/n data packets have been down-clocked by a factor (e.g., 4) to realize a data rate substantially equal to the data rate of the data packet 300. Two or more long training field symbols may be transmitted prior to the signal field 330 to boost channel estimation. The boosted channel estimation may extract more (or the full) gain associated with lowering the code rate. Additionally, or in the alternative, the short training field 310 and/or the long training fields 320 may include more power (e.g., a power boost) as compared to the corresponding training fields used in the 802.11ac/n data packet to realize more gain associated with lowering the code rate.

In a particular embodiment, the short training field 310 may be spread over tones (e.g., 64 tones or 256 tones) with every $n^{th}$ (e.g., $4^{th}$ or $16^{th}$) tone being populated, as described with reference to FIG. 2. Different tone populations may be used to indicate an adjusted rate. Alternately, an orthogonal sequence in the long training fields 320 may be modified to indicate an adjusted rate.

The data packet 300 of FIG. 3 may have a reduced data rate compared to a legacy data packet. For example, the data rate of the data packet 300 may be reduced to approximately 1.5-1.625 Mbps as compared to the 6.0-6.5 Mbps legacy data rate of a legacy data packet. Reducing the data rate may improve a signal-to-noise-ratio (SNR) of the data packet 300 during transmission over the 802.11 wireless network. The two or more long training fields 320 may be used to extract more (or the full) benefit of the improved SNR. The reduced data rate may also improve transmission efficiency for data packets that are transmitted with a low transmit power.

Figure 4:
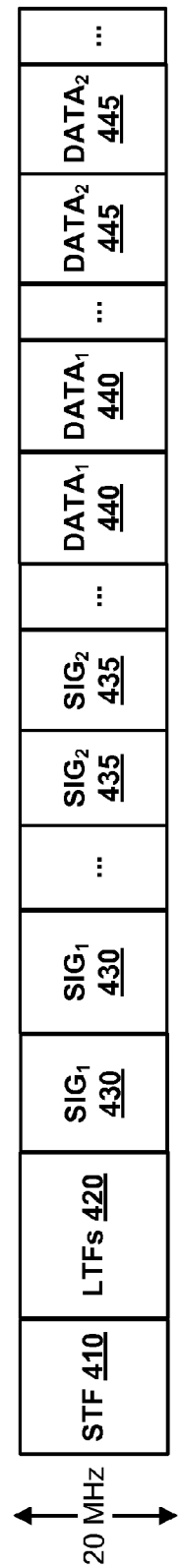
FIG. 4 is another particular embodiment of a data packet that is generated by the source device in FIG. 1.

Referring to FIG. 4, another particular embodiment of a data packet 400 that is communicated using an 802.11 wireless network is shown. In a particular embodiment, the data packet 400 may correspond to the low rate data packet 140 of FIG. 1 that is transmitted by the source device 102 to the destination device 122 via the wireless network 150. FIG. 4 illustrates an example of time domain duplication of data symbols. For example, as further described herein, data symbols of the data packet 400 are duplicated over a time period associated with the data packet 400.

The data packet 400 includes a short training field 410, long training fields 420, a first set of signal field symbols 430, a second set of signal field symbols 435, a first set of data symbols 440, and a second set of data symbols 445. Based on a data rate of the data packet, the data packet 400 may also include additional sets of signal field symbols (not shown) and additional sets of data field symbols (not shown). For example, a lower data rate may require more fields because symbols will be spread out over a greater time period. A preamble of the data packet 400 includes the short training field 410, the long training fields 420, and the signal field symbols 430, 435. In a particular embodiment, there may be two or more long training fields 420 in the data packet 400.

Multiple data symbols may be duplicated at multiple time intervals of the data packet 400. For example, the first set of signal field symbols 430 may correspond to a first signal field symbol duplicated at different time intervals of the data packet 400. The second set of signal field symbols 435 may correspond to a second signal field symbol duplicated in the time domain. Similarly, the first set of data symbols 440 and the second set of data symbols 445 may correspond to first and second data payload symbols duplicated in the time domain.

In a particular embodiment, the short training field 410 may be spread over tones (e.g., 64 tones or 256 tones) with every $n^{th}$ (e.g., $4^{th}$ or $16^{th}$) tone being populated, as described with reference to FIG. 2. Different tone populations may be used to indicate an adjusted rate. Alternately, an orthogonal sequence in the long training fields 420 may be modified to indicate an adjusted rate.

Duplicating the symbols in the signal field symbols 430-435 and the data symbols 440-445 over different time intervals may reduce a data rate of the data packet 400. For example, the data rate of the data packet 400 may be reduced to approximately 1.5-1.625 Mbps as compared to the 6.0-6.5 Mbps legacy data rate of a legacy data packet. Reducing the data rate may improve a signal-to-noise-ratio (SNR) of the data packet 400 during transmission over the 802.11 wireless network. The two or more long training fields 420 may be used to extract more (or the full) benefit of the improved SNR. The reduced data rate may also improve transmission efficiency for data packets that are transmitted with a low transmit power. Thus, in the packet 400, 2 to 4 symbols may carry the same data (e.g., signal field data or payload data). In a particular embodiment, the same constellation symbol may be carried on different tones. In alternate embodiments, low rate modes may be based on 128 tones instead of 256 tones.

Figure 5:
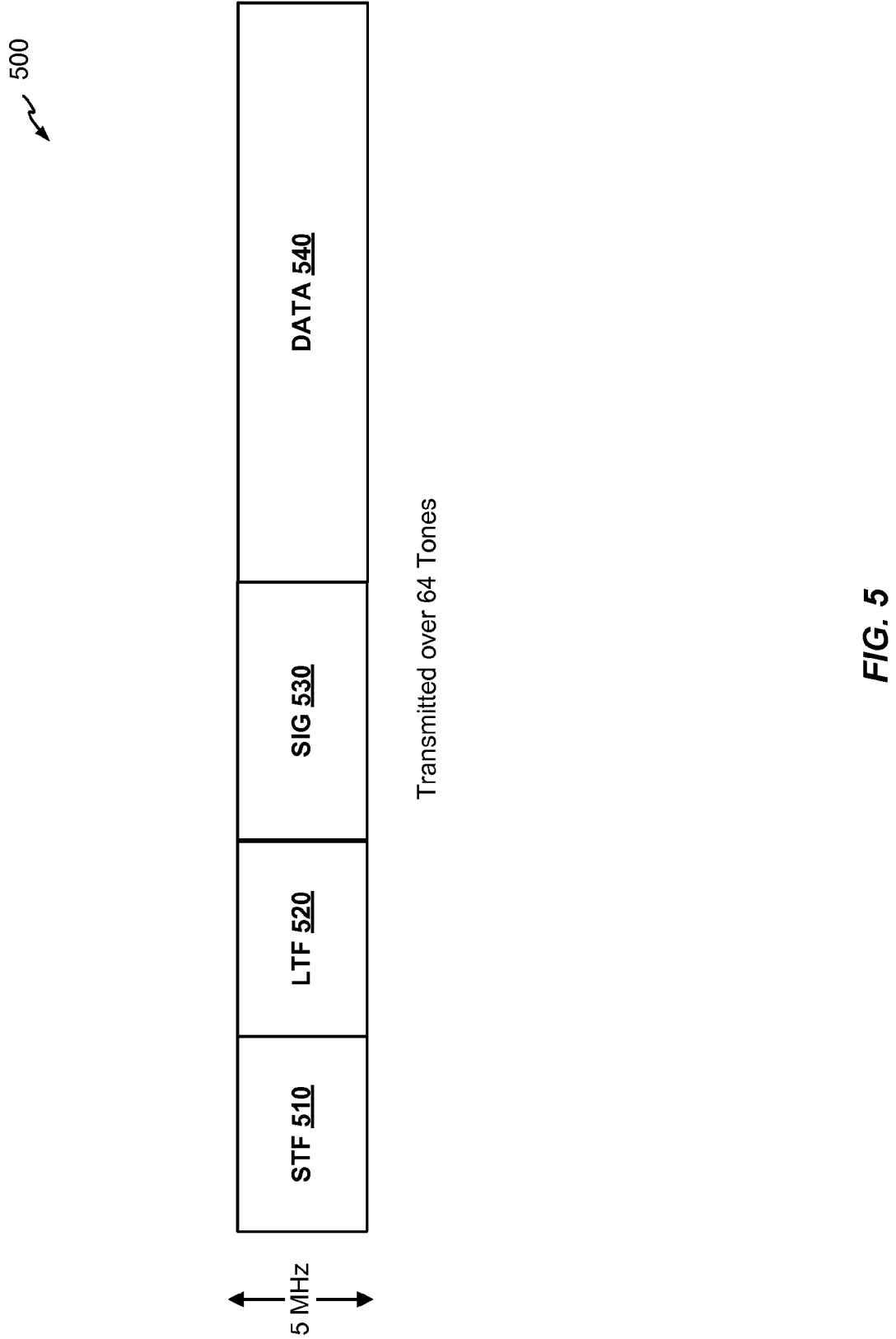
FIG. 5 is another particular embodiment of a data packet that is generated by the source device in FIG. 1.

Referring to FIG. 5, another particular embodiment of a data packet 500 that is communicated using an 802.11 wireless network is shown. In a particular embodiment, the data packet 500 may correspond to the low rate data packet 140 of FIG. 1 that is transmitted by the source device 102 to the destination device 122 via the wireless network 150.

The data packet 500 includes a short training field 510, a long training field 520, a signal field 530, and a data field 540. The data packet 500 is a 5 MHz data packet that is communicated using sixty-four tones (e.g., subcarriers). For example, the data packet 500 may be generated by down-clocking a legacy data packet having a bandwidth of 20 MHz communicated using 64 tones (e.g., an 802.11a data packet) by a factor of four. Thus, as shown in FIG. 5, lowered rate of a packet (or a portion thereof) may be achieved by using a lower bandwidth (e.g., using 64 tones in 5 MHz).

The data packet 500 may be four times as long as the legacy data packet and may have a lower data rate than the legacy data packet. For example, the data packet 500 may have a data rate of approximately 1.5-1.625 Mbps (e.g., 25% of the 6.0-6.5 Mbps of the data rate of a legacy data packet). The data packet 500 may be less susceptible to interference during data transmission. Reducing the data rate of a data packet may also reduce a receiver power requirement. For example, because less noise may be present at lower bandwidth, a lower receiver power may be needed to maintain a particular SNR. Thus, transmission range of the data packet 500 may be increased based on the lowered data rate.

During uplink transmissions, the data packet 500 (e.g., the 5 MHz data packet) may be generated by down-clocking an 802.11ac packet or an 802.11n packet by a factor to support a single user transmission. The legacy data packet 500 may be used for uplink transmission associated with orthogonal frequency division multiple access (OFDMA) with a basic service set (BSS) and/or frequency division multiplex (FDM) across a BSS in interference limited scenarios using access point (AP) coordination. The data packet 500 may also mitigate a delay spread and may not require new tone allocations with respect to the legacy data packet. For example, corresponding data symbols in the data packet 500 and the legacy data packet may be spread using common tone allocation power.

During downlink transmissions, the data packet 500 may be used in response to a determination the legacy data rate (e.g., 6 Mbps) of a 20 MHz data packet (e.g., the legacy data packet) fails due to a low SNR. For example, the lower data rate (e.g., 1.5 Mbps) of the data packet 500 may be less susceptible to interference.

The data packet 500 in FIG. 5 may improve the quality of performance with respect to a power ratio. For example, transmit power from the source device 102 to the destination device 122 may be spread over a 5 MHz bandwidth as opposed to a 20 MHz bandwidth associated with the legacy data packet (e.g., the 802.11a data packet). Thus, generating the data packet 500 in FIG. 5 may increase the likelihood that the destination device 122 detects data transmitted by a source device 102 having a low transmit power. The data packet 500 may also reduce an interference density during transmission in an 802.11 wireless network. For example, the 5 MHz bandwidth may reduce the likelihood of interference during transmission because the data packet 500 uses a smaller bandwidth than the bandwidth (e.g., 20 MHz) of the legacy data packet.

Figure 6:
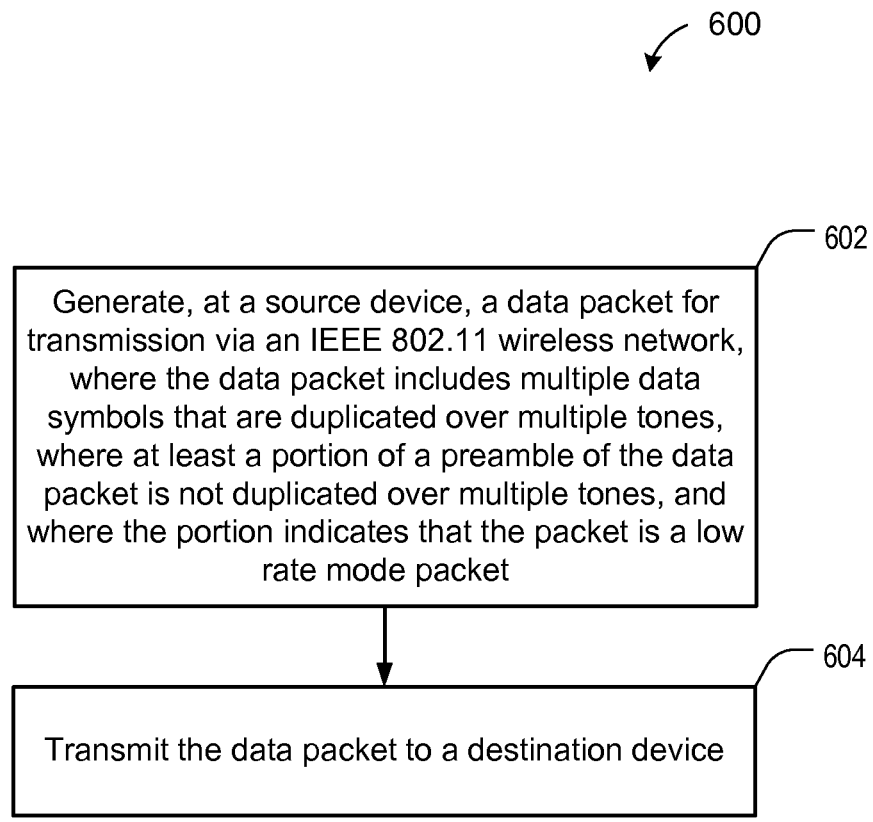
FIG. 6 is a flowchart illustrating a particular embodiment of a method for generating a low data rate packet in an IEEE 802.11 wireless network.

Referring to FIG. 6, a particular embodiment of a method 600 for generating a low data rate packet in an 802.11 wireless network is shown. The method 600 may be performed using the source device 102 of FIG. 1 and the components thereof.

The method 600 includes generating, at a source device, a data packet for transmission via an IEEE 802.11 wireless network, at 602. Multiple data symbols of the data packet may be duplicated (e.g., the data packet may include multiple copies of the data symbols). For example, the source device 102 of FIG. 1 may generate the data packet 200 of FIG. 2 having multiple data symbols that are duplicated over multiple tones. The signal fields 230 include four signal fields, and the data fields 240 include four data fields that include data symbols. Each signal field 230 and each corresponding data field 240 may be duplicated over multiple tones (e.g., 256 subcarriers) of the data packet 200. For example, the data packet 200 may have a bandwidth of 20 MHz that is spread over 256 tones. Each signal field 230 and corresponding data field 240 may be duplicated over a five MHz bandwidth (e.g., 64 tones). A non-duplicated portion of the preamble (e.g., STF or LTF) may indicate that the packet is a low rate mode.

At least a portion of a preamble of the data packet 200 is not duplicated over the 256 tones. For example, the short training field 210 and/or the long training fields 220 may not be duplicated (e.g., may not include data that is duplicated every 5 MHz). The data packet 200 may be communicated using a first number of tones (e.g., 256 tones) that is greater than a second number of tones (e.g., 64 tones) used to communicate a legacy data packet having a similar bandwidth (e.g., 20 MHz).

The data packet may be transmitted, at 604. For example, in FIG. 1, the source device 102 may transmit the data packet 200 (e.g., the low rate data packet 140 of FIG. 1) to the destination device 122 over the wireless network 150.

The method 600 of FIG. 6 may enable a reduced data rate (e.g., 1.5-1.625 Mbps) of transmission as compared to the legacy data rate (e.g., 6-6.5 Mbps) of a legacy data packet. The reduced data rate may improve a signal-to-noise-ratio (SNR) of the data packet 200 during transmission over the 802.11 wireless network. The two or more long training fields 220 may be used to extract more (or the full) benefit of the improved SNR. The reduced data rate may also improve transmission efficiency for data packets that are transmitted with a low transmit power.

Figure 7:
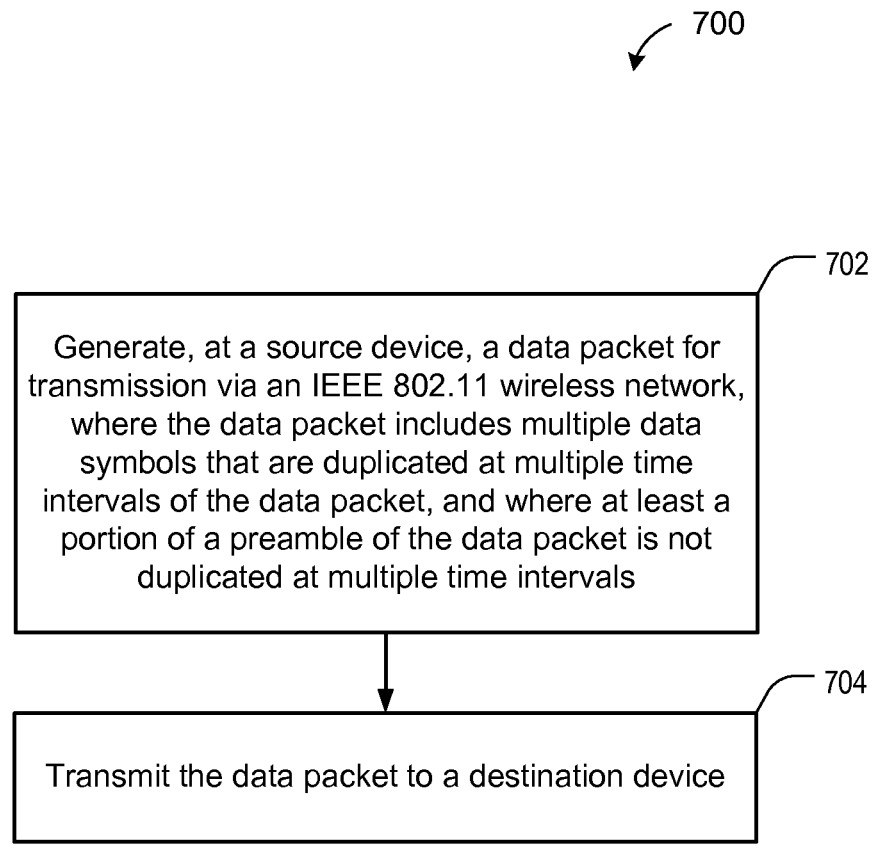
FIG. 7 is a flowchart illustrating another particular embodiment of a method for generating a low data rate packet in an IEEE 802.11 wireless network.

Referring to FIG. 7, another particular embodiment of a method 700 for generating a low data rate packet in an 802.11 wireless network is shown. The method 700 may be performed using the source device 102 of FIG. 1 and the components thereof.

The method 700 may include generating, at a source device, a data packet for transmission via an IEEE 802.11 wireless network, at 702. Multiple data symbols of the data packet may be duplicated (e.g., the data packet may include multiple copies of the data symbols). For example, the source device 102 of FIG. 1 may generate the data packet 400 of FIG. 4 having multiple data symbols that are duplicated at multiple time intervals.

At least a portion of a preamble of the data packet 200 is not duplicated at multiple time intervals. For example, the short training field 410 and/or the long training fields 420 may not be duplicated (e.g., may not include data that is duplicated in the time domain).

The data packet may be transmitted, at 704. For example, in FIG. 1, the source device 102 may transmit the data packet 400 (e.g., the low rate data packet 140 of FIG. 1) to the destination device 122 over the wireless network 150.

The method 700 of FIG. 7 may enable a reduced data rate (e.g., 1.5-1.625 Mbps) of transmission as compared to the legacy data rate (e.g., 6-6.5 Mbps) of a legacy data packet. The reduced data rate may improve a signal-to-noise-ratio (SNR) of the data packet 400 during transmission over the 802.11 wireless network. The two or more long training fields 420 may be used to extract more (or the full) benefit of the improved SNR. The reduced data rate may also improve transmission efficiency for data packets that are transmitted with a low transmit power.

Figure 8:
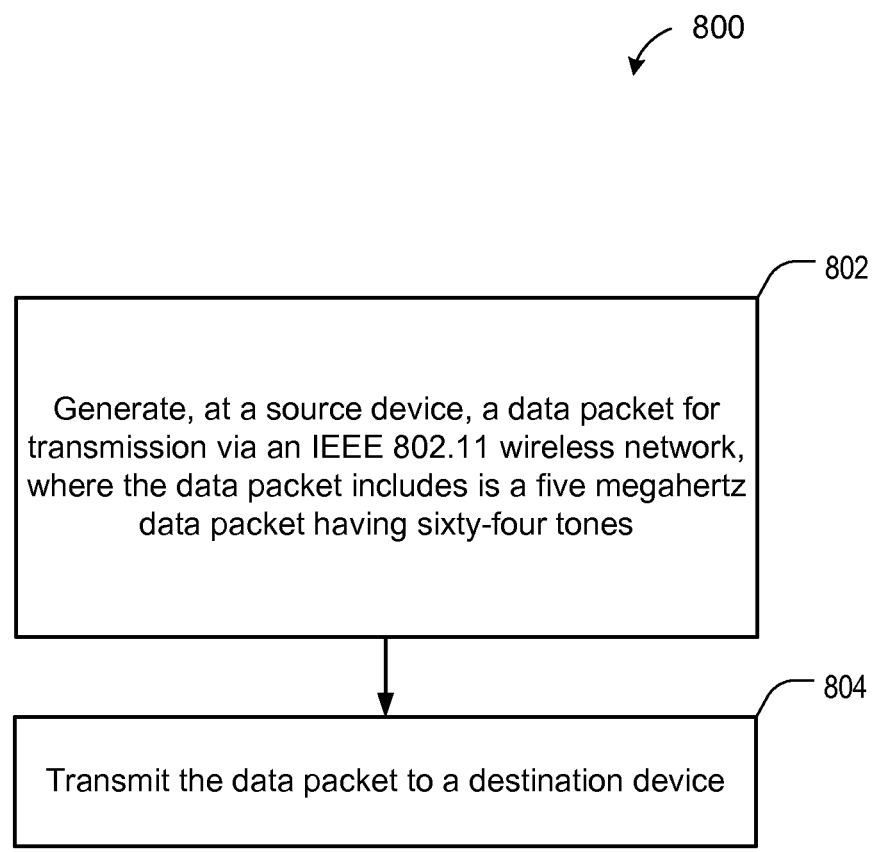
FIG. 8 is a flowchart illustrating another particular embodiment of a method for generating a low data rate packet in an IEEE 802.11 wireless network.

Referring to FIG. 8, another particular embodiment of a method 800 for generating a low data rate packet in an 802.11 wireless network is shown. The method 800 may be performed using the source device 102 of FIG. 1 and the components thereof.

The method 800 may include generating, at a source device, a data packet for transmission via an IEEE 802.11 wireless network, at 802. For example, the source device 102 of FIG. 1 may generate the data packet 500 of FIG. 5. The data packet 500 is a 5 MHz data packet that is communicated using sixty-four tones (e.g., subcarriers). For example, the data packet 500 may be generated by downclocking a legacy data packet having a bandwidth of 20 MHz communicated using 64 tones (e.g., an 802.11a data packet) by a factor of four.

The data packet may be transmitted, at 804. For example, in FIG. 1, the source device 102 may transmit the data packet 500 (e.g., the low rate data packet 140 of FIG. 1) to the destination device 122 over the wireless network 150.

The method of FIG. 8 may permit a reduced data rate (e.g., 1.5-1.625 Mbps) of transmission as compared to the legacy data rate (e.g., 6-6.5 Mbps) of a legacy data packet. The reduced data rate may improve a signal-to-noise-ratio (SNR) of the data packet 500 during transmission over the 802.11 wireless network. The reduced data rate may also improve transmission efficiency for data packets that are transmitted with a low transmit power.

Figure 9:
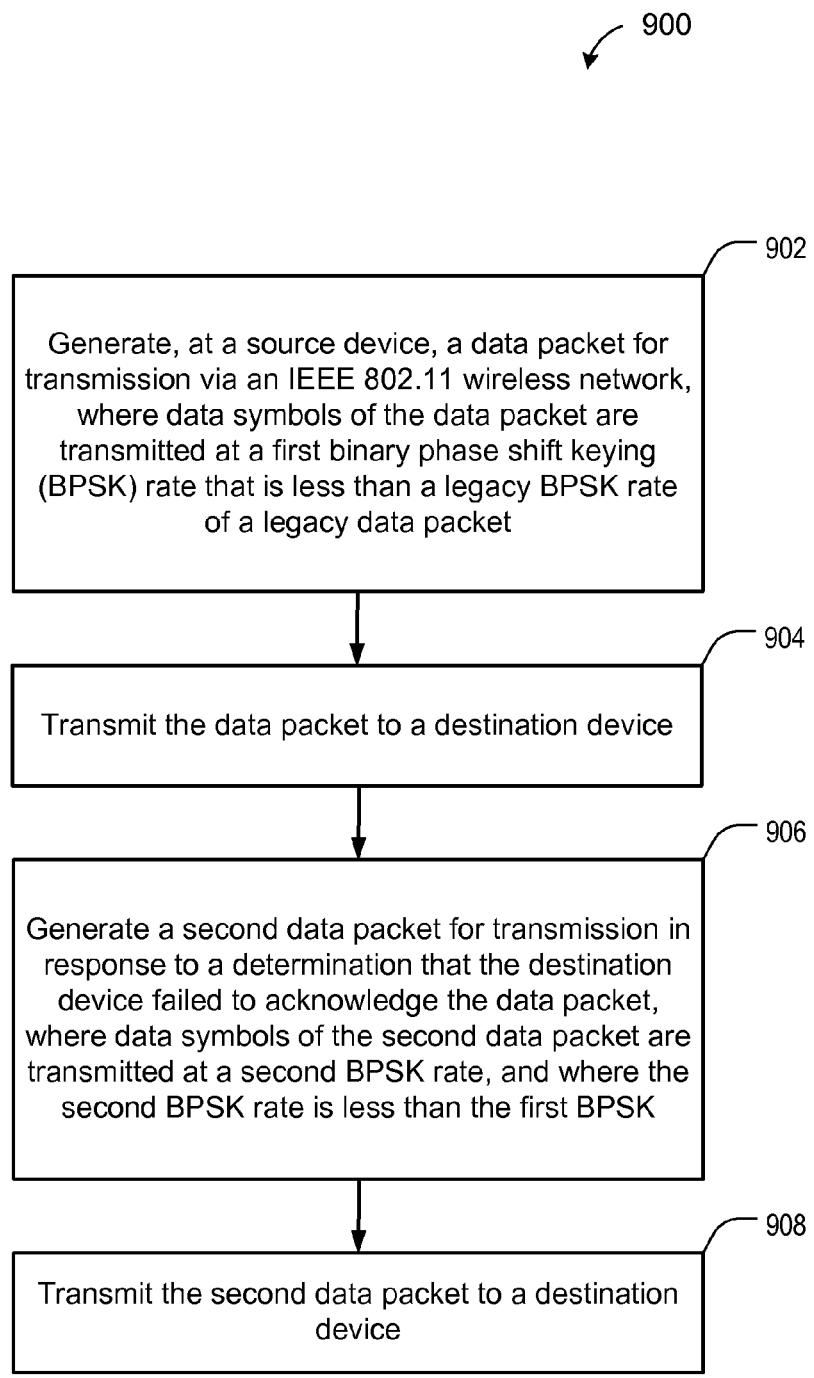
FIG. 9 is a flowchart illustrating another particular embodiment of a method for generating a low data rate packet in an IEEE 802.11 wireless network.

Referring to FIG. 9, another particular embodiment of a method 900 for generating a low data rate packet in an 802.11 wireless network is shown. The method 900 may be performed using the source device 102 of FIG. 1 and the components thereof.

The method 900 may include generating, at a source device, a data packet for transmission via an IEEE 802.11 wireless network, at 902. For example, the source device 102 of FIG. 1 may generate the data packet 300 of FIG. 3. The data symbols of the data packet 300 may be transmitted at a first BPSK rate that is less than a legacy BPSK rate of a legacy data packet. For example, OFDMA symbols in the signal field 330 and data symbols in the data field 340 may be generated using a base rate of ⅛, which may be less than a coding rate (e.g., ½) of a legacy BPSK data packet associated with legacy standard (e.g., an 802.11a standard, an 802.11g standard, an 802.11n standard, or an 802.11ac standard). In a particular embodiment, the base code rate may be used to selectively decrease the rate at which data is transmitted over an 802.11 wireless network. During a first transmission, the data packet 300 may include a parity bit for every data bit that is transmitted (e.g., a ½ rate transmission).

The data packet may be transmitted to a destination device, at 904. For example, in FIG. 1, the source device 102 may transmit the data packet 300 (e.g., the low rate data packet 140 of FIG. 1) to the destination device 122 over the wireless network 150 using the ½ rate transmission.

A second data packet for transmission may be generated in response to a determination that the destination device failed to acknowledge the data packet, at 906. For example, if the data packet 300 is unable to be decoded (or detected) by the destination device 122 using the ½ rate transmission, the reduced code rate of the data packet 300 may enable hybrid automatic repeat request (HARQ) during data transmission. The rate may be reduced based on the base code rate. For example, additional parity bits may be tried for every data bit that is transmitted (e.g., a ⅓ rate transmission may be tried, then a ¼ rate transmission may be tried, etc.) until seven parity bits are used for every data bit that is transmitted (e.g., the ⅛ code rate). The rate may be continuously reduced using the base code rate until the data packet 300 is successfully decoded at the destination device.

The second data packet may be transmitted to the destination device, at 908. For example, in FIG. 1, the source device 102 may transmit a data packet having two parity bits for every data bit to the destination device 122 over the wireless network 150.

The method 900 of FIG. 9 may enable HARQ during data transmission to selectively decrement the code rate until transmission is successful. Selectively decrementing the code rate may result in a reduced data rate (e.g., 1.5-1.625 Mbps) of transmission as compared to the legacy data rate (e.g., 6-6.5 Mbps) of a legacy data packet. The reduced data rate may improve a signal-to-noise-ratio (SNR) of the data packet 200 during transmission over the 802.11 wireless network. The two or more long training fields 220 may be used to extract more (or the full) benefit of the improved SNR. The reduced data rate may also improve transmission efficiency for data packets that are transmitted with a low transmit power.

Figure 10:
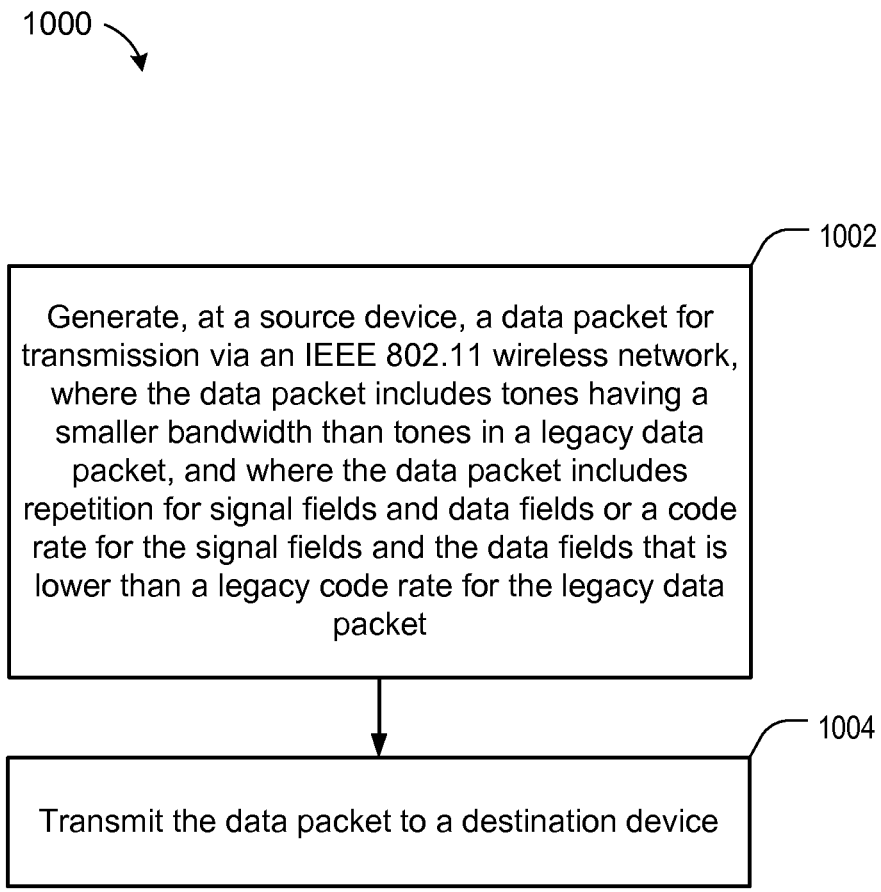
FIG. 10 is a flowchart illustrating another particular embodiment of a method for generating a low data rate packet in an IEEE 802.11 wireless network.

Referring to FIG. 10, another particular embodiment of a method 1000 for generating a low data rate packet in an 802.11 wireless network is shown. The method 1000 may be performed using the source device 102 of FIG. 1 and the components thereof.

The method 1000 may include may include generating, at a source device, a data packet for transmission via an IEEE 802.11 wireless network, at 1002. For example, the source device 102 of FIG. 1 may generate the data packet 140. The data packet 140 may be communicated using tones having a smaller bandwidth than tones in a legacy data packet. For example, the data packet 140 may be a 20 MHz data packet that is communicated using 256 tones, where each tone has a bandwidth approximately equal to 78.125 hertz (Hz). The legacy data packet (e.g., an IEEE 802.11a data packet, an IEEE 802.11g data packet, an IEEE 802.11n data packet, or an IEEE 802.11ac data packet) may be 20 MHz data packet that is communicated using 64 tones, where each tone has a bandwidth approximately equal to 312.5 Hz.

In a particular embodiment, the data packet 140 may include repetition for signal fields and data fields. For example, the data packet 140 may correspond to the data packet 200 of FIG. 2 and may include frequency domain repetition for the signal fields 230 and the data fields 240. As another example, the data packet 140 may correspond to the data packet 400 of FIG. 4 and may include time domain repetition for each set of signal fields 430, 435 and each set of data fields 440, 445.

In another particular embodiment, a code rate for the signal fields and the data fields may be lower than a legacy code rate for the legacy data packet. For example, the data packet 140 may correspond to the data packet 300 of FIG. 3 and may have a BPSK modulation scheme having a reduced FEC code rate (e.g., a ⅛ code rate) as compared to a legacy FEC code rate of ½).

The data packet may be transmitted to a destination device, at 1004. For example, in FIG. 1, the source device 102 may transmit the data packet 140 to the destination device 122 over the wireless network 150.

The data packet may thus represent a low rate data packet that has: 1) longer symbols (due to the smaller tones) and 2) duplication of certain portions of the packet or a low code rate. The longer symbols/smaller tones may provide delay spread protection due to a longer cyclic prefix. Such a data packet may be robust to inter-symbol interference due to the longer cyclic prefix and may reduce receiver power requirement to maintain a particular SNR due to reduced noise present at lower bandwidths.

Figure 11:
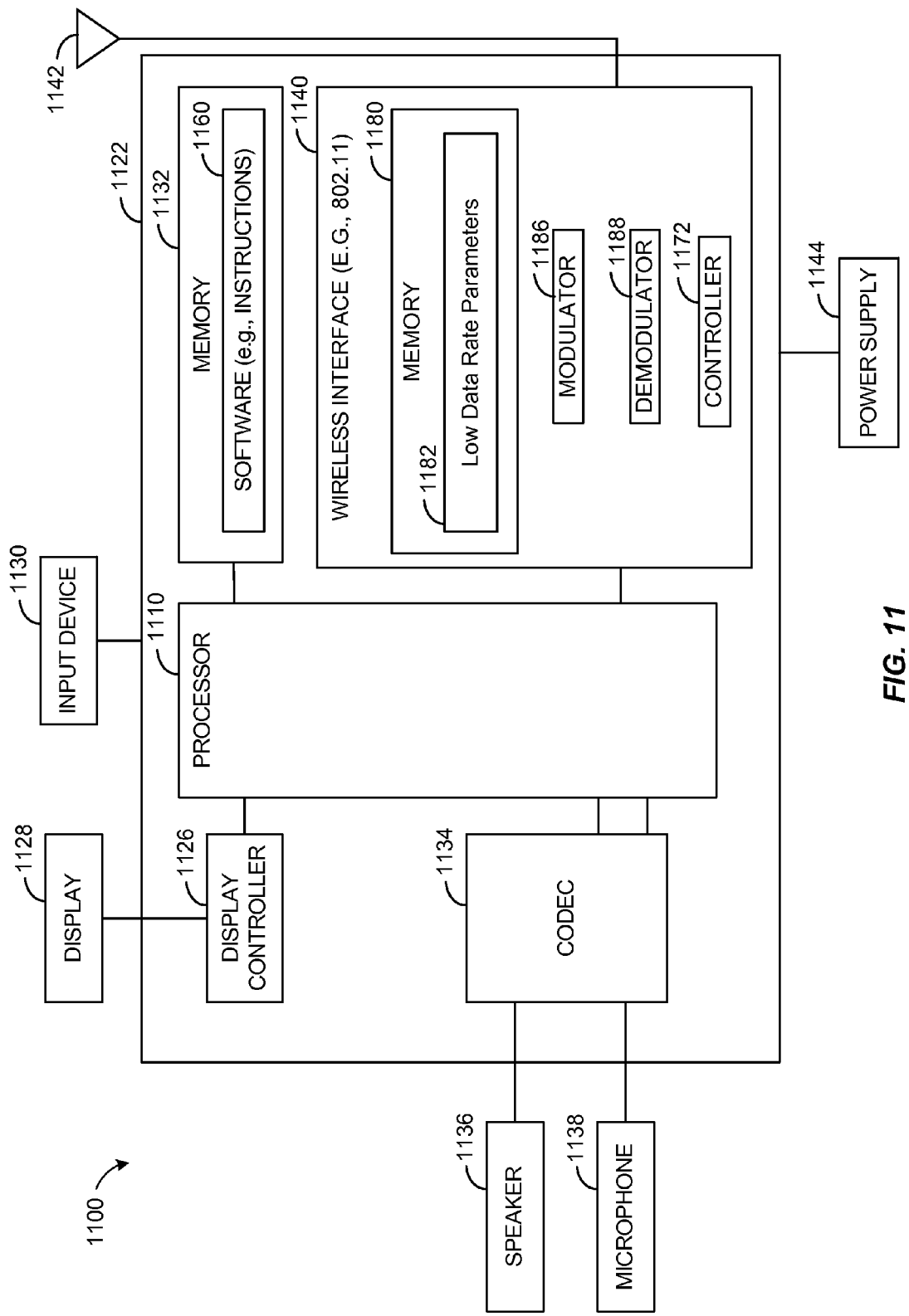
FIG. 11 is a diagram of a wireless device that is operable to support various embodiments of one or more methods, systems, apparatuses, and/or computer-readable media disclosed herein.

Referring to FIG. 11, a block diagram of a particular illustrative embodiment of a wireless communication device is depicted and generally designated 1100. The device 1100 includes a processor 1110, such as a digital signal processor, coupled to a memory 1132. In an illustrative embodiment, the device 1100 may be the source device 102 of FIG. 1 or the destination device 122 of FIG. 1.

The processor 1110 may be configured to execute software 1160 (e.g., a program of one or more instructions) stored in the memory 1132. Additionally or alternatively, the processor 1110 may be configured to implement one or more instructions stored in a memory 1180 of a wireless interface 1140 (e.g., an IEEE 802.11 wireless interface), as described further herein. In a particular embodiment, the processor 1110 may be configured to operate in accordance with the methods 600-1000 of FIGS. 6-10. In a particular embodiment, the processor 1110 may correspond to the processor 104 or 124 of FIG. 1, and the memory 1132 may correspond to the memory 106 or 126 of FIG. 1.

The wireless interface 1140 may be coupled to the processor 1110 and to an antenna 1142 such that wireless data received via the antenna 1142 and wireless interface 1140 may be provided to the processor 1110. For example, the wireless interface 1140 may include or correspond to the wireless interface 110, 130 of FIG. 1. The wireless interface 1140 may include the memory 1180 and a controller 1172. The memory 1180 may include low data rate parameters 1182 (e.g., the low data rate parameters 112 or 132 of FIG. 1). In a particular embodiment, the wireless interface 1140 may also include a modulator 1186 and a demodulator 1188 for uplink and downlink communication, respectively.

The controller 1172 may be configured to interface with the processor 1110 to execute one or more instructions stored in the memory 1180. The controller 1172 may also be configured to interface with the processor 1110 to execute the modulator 1186 and/or the demodulator 1188. Additionally or alternatively, the controller 1172 may include a processor configured to execute one or more of the instructions stored in the memory 1180.

In a particular embodiment, the processor 1110, the display controller 1126, the memory 1132, the CODEC 1134, and the wireless interface 1140, are included in a system-in-package or system-on-chip device 1122. In a particular embodiment, an input device 1130 and a power supply 1144 are coupled to the system-on-chip device 1122. Moreover, in a particular embodiment, as illustrated in FIG. 11, the display device 1128, the input device 1130, the speaker 1136, the microphone 1138, the antenna 1142, and the power supply 1144 are external to the system-on-chip device 1122. However, each of the display device 1128, the input device 1130, the speaker 1136, the microphone 1138, the antenna 1142, and the power supply 1144 can be coupled to one or more components of the system-on-chip device 1122, such as one or more interfaces or controllers.

In conjunction with the described embodiments, an apparatus may include means for generating a data packet, means for transmitting the data packet, and/or means for receiving the data packet. The means for generating may include the processor 104, packet generator 108, the processor 124, the packet generator 128, the processor 1110, the wireless interface 1140 or a component thereof, another device configured to generate a data packet, or any combination thereof. The means for transmitting may include the wireless interface 110, the wireless interface 130, the wireless interface 1140 or a component thereof, the antenna 1142, another device configured to transmit a data packet, or any combination thereof. The means for receiving may include the wireless interface 110, the wireless interface 130, the wireless interface 1140 or a component thereof, the antenna 1142, another device configured to receive a data packet, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of communicating a packet, the method comprising:
   generating, at a source device, a data packet for transmission via a wireless local area network, the data packet including a preamble and a data payload, the preamble including a first portion and a legacy preamble portion that precedes the first portion, wherein the first portion indicates that the data packet is a low rate packet, and wherein the data payload includes at least one data symbol that is duplicated multiple times in the data payload; and transmitting the data packet from the source device to a destination device via the wireless network.

2. The method of claim 1, wherein the at least one data symbol is duplicated over multiple sub-bands of a frequency band associated with the data packet or over multiple time periods associated with the data packet.

3. The method of claim 1, wherein the data packet is communicated using a first number of tones that is greater than a second number of tones used to communicate an Institute of Electrical and Electronics Engineers (IEEE) 802.11a data packet, an IEEE 802.11g data packet, or an IEEE 802.11n data packet.

4. The method of claim 1, wherein the legacy preamble portion includes a particular preamble that complies with Institute of Electrical and Electronics Engineers (IEEE) 802.11a, IEEE 802.11g, or IEEE 802.11n.

5. The method of claim 3, wherein the data packet is communicated using a twenty megahertz (MHz) frequency band.

6. The method of claim 5, wherein the first number of tones corresponds to two-hundred fifty six tones.

7. The method of claim 1, wherein the first portion includes a short training field, a long training field, and a signal field.

8. The method of claim 7, wherein a periodicity of the short training field indicates the low rate packet.

9. The method of claim 7, wherein an orthogonal sequence of the long training field indicates the low rate packet.

10. The method of claim 7, wherein the first portion corresponds to at least one of the short training field or the long training field, and wherein the first portion is not duplicated multiple times in the data packet.

11. The method of claim 1, wherein the data packet is communicated using a twenty megahertz (MHz) frequency band that is divided into a first number of tones that is greater than a second number of tones used to communicate a legacy data packet by a first factor, the legacy data packet configured to be communicated using a twenty MHz frequency band that is divided into the second number of tones, and wherein the legacy data packet comprises an Institute of Electrical and Electronics Engineers (IEEE) 802.11a data packet, an IEEE 802.11g data packet, an IEEE 802.11n data packet, or an IEEE 802.11ac data packet.

12. The method of claim 1, wherein the data packet is communicated using a five megahertz (MHz) frequency band that is divided into sixty-four tones.

13. A non-transitory computer-readable medium comprising instructions that, when executed by a computer, cause the computer to perform operations comprising:

generating, at a source device, a data packet for transmission via a wireless local area network, the data packet including a preamble and a data payload, the preamble including a first portion and a legacy preamble portion that precedes the first portion, wherein the first portion indicates that the data packet is a low rate packet, and wherein the data payload includes at least one data symbol that is duplicated multiple times in the data payload; and transmitting the data packet from the source device to a destination device via the wireless network.

14. The non-transitory computer-readable medium of claim 13, wherein the data packet is communicated using a twenty megahertz (MHz) frequency band.

15. The non-transitory computer-readable medium of claim 13, wherein the first portion includes a short training field, and wherein a periodicity of the short training field indicates the low rate packet.

16. The non-transitory computer-readable medium of claim 13, wherein the first portion includes a long training field, and wherein an orthogonal sequence of the long training field indicates the low rate packet.

17. The non-transitory computer-readable medium of claim 13, wherein a data rate of the data packet is between approximately 1.5 megabits per second (Mbps) and 1.625 Mbps.

18. The non-transitory computer-readable medium of claim 13, wherein data symbols of the data packet are binary phase shift keying (BPSK) modulated and coded at a first coding rate that is less than a legacy BPSK coding rate of an Institute of Electrical and Electronics Engineers (IEEE) 802.11a data packet, an IEEE 802.11g data packet, an IEEE 802.11n data packet, or an IEEE 802.11ac data packet.

19. The non-transitory computer-readable medium of claim 18, wherein the data symbols are communicated using two-hundred fifty-six tones.

20. The non-transitory computer-readable medium of claim 18, wherein the operations further comprise generating a second data packet for transmission in response to a determination that the destination device failed to acknowledge receipt of the data packet, and wherein data symbols of the second data packet are BPSK modulated and coded at a second coding rate that is less than the first coding rate.

21. An apparatus comprising:

a processor; and a memory storing instructions executable by the processor to perform operations comprising:

generating, at a source device, a data packet for transmission via a wireless local area network, the data packet including a preamble and a data payload, the preamble including a first portion and a legacy preamble that precedes the first portion, wherein the first portion indicates that the data packet is a low rate packet, and wherein the data payload includes at least one data symbol that is duplicated multiple times in the data payload; and transmitting the data packet from the source device to a destination device via the wireless network.

22. The apparatus of claim 21, wherein the data packet includes duplicated signal fields and data fields.

23. The apparatus of claim 21, wherein the data packet is communicated using tones having a smaller bandwidth than tones used to communicate a legacy data packet, and wherein a code rate for signal fields and data fields of the data packet is lower than a legacy code rate for the legacy data packet.

24. The apparatus of claim 21, wherein the data packet includes a long training field that includes more than two symbols, and wherein the long training field precedes a signal field in the data packet.

25. An apparatus comprising:

means for generating a data packet to be transmitted via a wireless local area network, the data packet including a preamble and a data payload, the preamble including a first portion and a legacy preamble portion that precedes the first portion, wherein the first portion indicates that the data packet is a low rate packet, and wherein the data payload includes at least one data symbol that is duplicated multiple times in the data payload; and means for transmitting the data packet via the wireless network.

26. The apparatus of claim 25, wherein the legacy preamble portion is decodable by a legacy device to cause the legacy device to refrain from communication via the wireless local area network during a time period during which the data packet is communicated.

27. The apparatus of claim 26, wherein the wireless local area network comprises a high efficiency Wi-Fi (HEW) wireless network, and wherein the legacy device is compatible with an Institute of Electrical and Electronics Engineers (IEEE) 802.11a standard, an IEEE 802.11g standard, an IEEE 802.11n standard, or any combination thereof.

28. The apparatus of claim 25, wherein the first portion comprises a short training field, and wherein the preamble includes a second portion that is preceded by the first portion, the second portion comprising a long training field.

29. The method of claim 11, wherein the data packet includes a short training field, and wherein the short training field of the data packet is transmitted using a number of tones, the number of tones is based on a second factor that is less than the first factor.

30. The non-transitory computer-readable medium of claim 13, wherein the operations further comprise, after transmission of the data packet to the destination device, generating a second data packet for transmission in response to a determination that the destination device failed to acknowledge receipt of the data packet, and wherein second data symbols of the second data packet are coded at a second coding rate that is less than a first coding rate of the data symbols of the data packet.

\* \* \* \* \*